(No Model.) 3 Sheets—Sheet 3.
M. DROLET & D. & U. MARCEAU.
HAY LOADER.
No. 557,978. Patented Apr. 7, 1896.

Witnesses:—
Jno. W. Adams
Clinton Hamlink

Inventors:—
Mederic Drolet
David Marceau
Ulric Marceau
by Dayton Pooler Brown his Att'ys

UNITED STATES PATENT OFFICE.

MEDERIC DROLET, DAVID MARCEAU, AND ULRIC MARCEAU, OF ST. ANNE, ILLINOIS.

HAY-LOADER.

SPECIFICATION forming part of Letters Patent No. 557,978, dated April 7, 1896.

Application filed September 20, 1894. Serial No. 523,585. (No model.)

*To all whom it may concern:*

Be it known that we, MEDERIC DROLET, DAVID MARCEAU, and ULRIC MARCEAU, residents of St. Anne, in the county of Kankakee and State of Illinois, have invented certain new and useful Improvements in Hay-Loaders; and we do hereby declare that the following is a full, clear, and exact description thereof, reference being had to the accompanying drawings, and to the letters of reference marked thereon, which form a part of this specification.

This invention relates to hay-loaders of that class which are adapted to pick up and elevate the hay directly from the swath to the wagon, being in use attached to and trained behind the wagon being loaded.

More specifically the present invention relates to loaders of the general class above referred to which comprise an elevator of the "walking-motion" order, having pronged elevator bars which act in conjunction with a wheeled rake to elevate the hay as fast as collected.

Among the objects of the invention are to provide a simple, strong, and durable machine which by reason of its construction is particularly free from liability to choke or clog and which shall accomplish its work in a positive and clean manner under all ordinary circumstances, whether in windy or still weather and whether the hay be somewhat damp and heavy or extremely dry, light, and fluffy.

Various improvements in details of construction by which the machine is rendered more convenient and certain in its action are embraced in the invention.

The invention consists in the matters hereinafter described, and more particularly pointed out in the appended claims, and the same will be more readily understood by reference to the accompanying drawings, in which—

Figure 1:
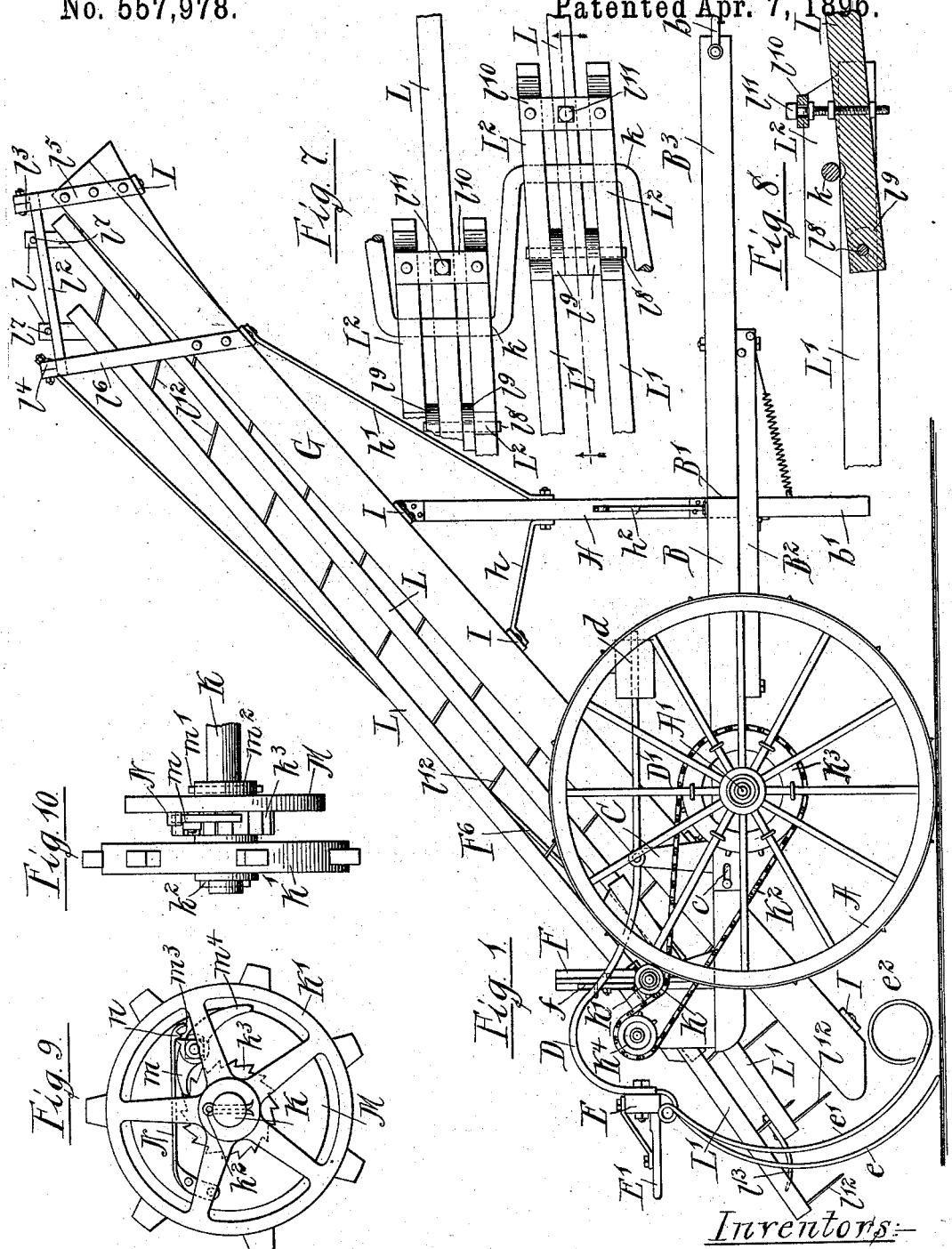
Figure 2:
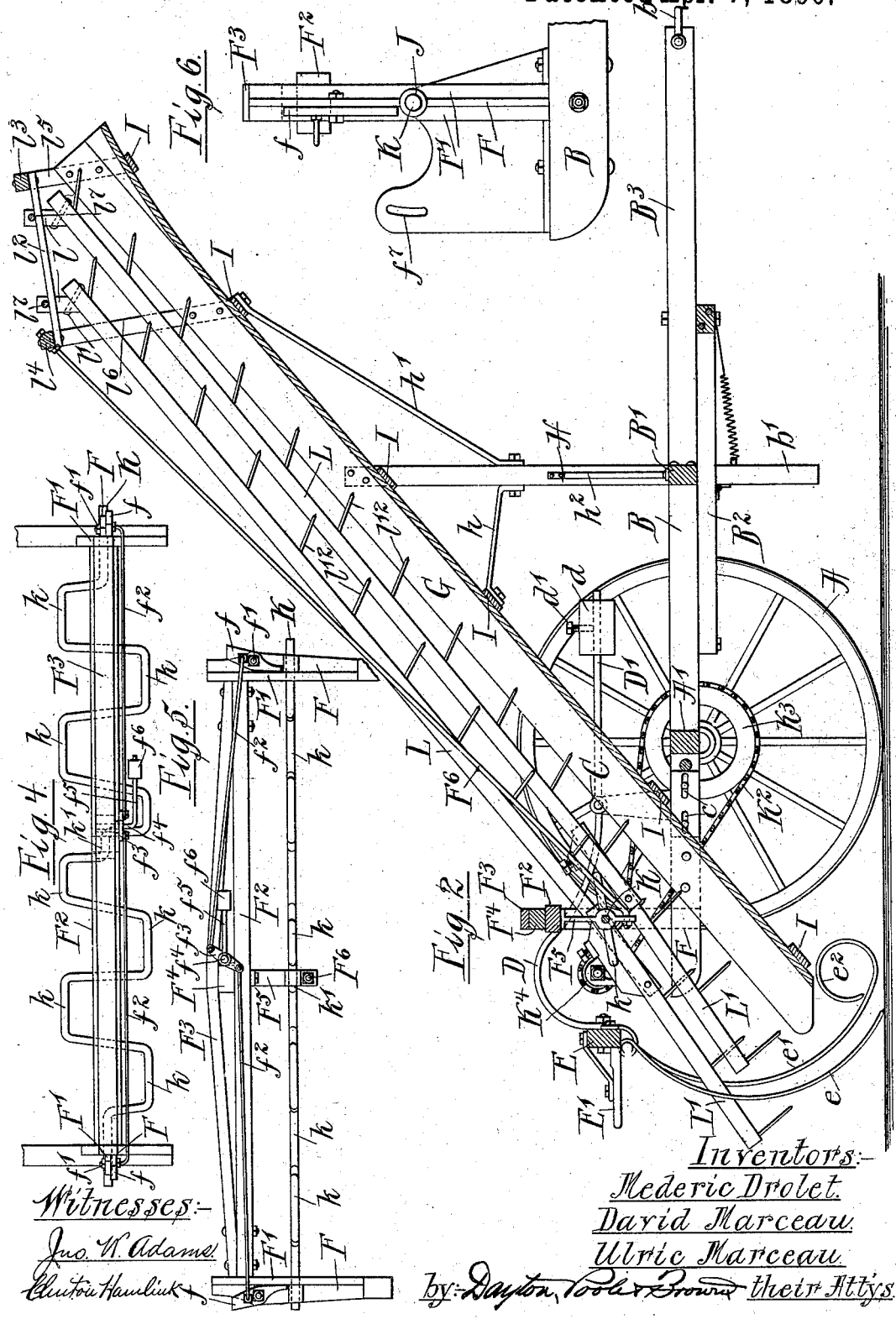
Figure 3:
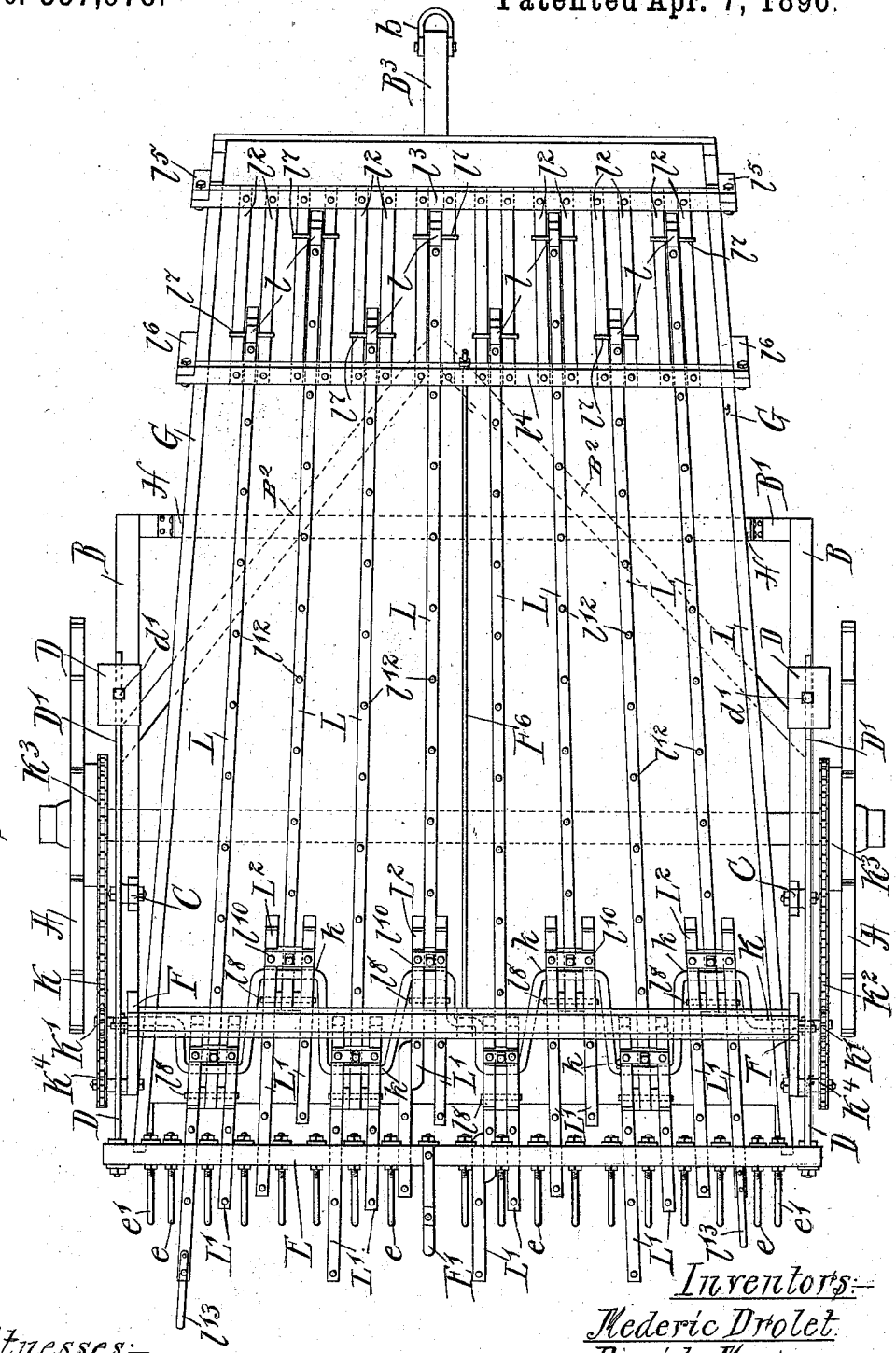

Figure 1 is a side elevation of a machine embodying our invention. Fig. 2 is a central vertical longitudinal section of the same. Fig. 3 is a plan view. Fig. 4 is a detail plan view of the crank-shaft and its supports, showing also the arrangement of the rake-arm-supporting catches. Fig. 5 is a rear end elevation of the parts shown in Fig. 4. Fig. 6 is a detail of one of the crank-shaft standards. Figs. 7 and 8 are details in plan and central longitudinal section, respectively, of the crank-shaft bearings and adjustable connection of the elevator-bars. Figs. 9 and 10 are end and side elevations, respectively, of the ungearing-ratchet and crank-shaft sprocket.

Referring to said drawings, A A designate the supporting-wheels of the machine, and B B main longitudinal frame-pieces supported in horizontal position upon the axle A', one at each side adjacent to the said wheels A A.

B' is a cross-timber secured to the front ends of the timbers B B. Hounds or draft-timbers $B^2 B^2$ are bolted diagonally across underneath the front corners of the rectangle formed by the frame-pieces B B and B' in such position as to meet in V shape at a central point in front of the cross-piece B'.

$B^3$ is a short tongue bolted to the upper sides of the hounds $B^2$ at the juncture of the latter and extending back and secured to the cross-timber B'. Said tongue $B^3$ is of proper length to extend beneath the wagon to be loaded to the back axle thereof, and will be conveniently attached to the latter by means of a clevis *b*, which is adapted to engage a hook mounted on said axle, or otherwise, as desired.

A depending leg or support *b'* is secured to the front part of the main frame, centrally thereof, and serves, when resting in contact with the ground, to hold the machine from dropping down at its forward end, so as to rest with its weight on the end of the tongue, thus preserving the latter from becoming warped or broken. In order that said depending support may not interfere in passing over obstructions, it is hinged, so as to permit it to yield backwardly, but held normally in its vertical position by means of a coiled spring attached to the front side thereof and to the front ends of the hounds.

C C are vertical standards secured to the frame-pieces B B at points near the axle A' by means of bolts passed through horizontal slots *c c*, permitting a backward or forward adjustment of said standards. The upper ends of these standards are apertured for the reception of the right-angled bent ends of rake-supporting arms D D. These arms extend back from the standards C C and are of proper length and curved, as shown, to bring the rake-head E, supported therefrom, into proper relation with the lower end of the hay-elevator, hereinafter to be described. The rake-head E is rigidly secured upon said supporting-arms D D and provided with the usual set of spring-teeth $e$ $e$ $e$. As a special feature of improvement the said rake-head E is provided with a guard-tooth $e'$ at each end thereof, said teeth being curved so as to stand somewhat in advance of the others and provided at their free ends with an integral ring or loop $e^2$, standing in a vertical plane. These guards are arranged to be normally carried free of the ground, but in such close proximity thereto as to engage the stubble as the rake is drawn along. The guards thus arranged effectually prevent the escape of hay which may be picked up by the rake-teeth proper, the vibration of said guards aiding materially, when the hay is quite light and inclined to roll, in throwing it within reach of the elevators. It will of course be obvious that one of said guards may be dispensed with by always going around the field to be raked in the same way, thus keeping the same end of the rake always toward the unraked portion.

The right-angled ends of the arms D D, which extend through the standards C C, form pivots upon which the rake oscillates, and in order to support the latter in elevated position while going from one field to another a second pair of standards F F are secured upon the frame-pieces B B at points intermediate of the length of said arms D D. These standards F F are each provided with a catch $f$ $f$, so arranged as to permit the arms to compress and pass by them as said rake-head is lifted up, but to spring out beneath the arms and retain the rake in elevated position when the latter has been lifted past said catches. The construction and arrangement of said catches is as follows:

Referring to Figs. 4 and 5, $f'$ $f'$ are bolts extending transversely through the catches $f$ $f$ and standards F F and forming pivotal supports for the former.

F' F' are flanges on the standards F, extending at right angles to the main body, against which the catches are pivoted, and forming shoulders against which the lower ends of said catches strike, thus limiting the distance which they may tilt outwardly at their upper ends.

$F^2$ is a main cross-bar, and $F^3$ a truss or strengthening-bar secured at each end to said bar $F^2$, but separated therefrom at the center by an interposed block $F^4$, both of said bars extending from one standard F to the other.

$f^2$ $f^2$ are small rods each secured at one end to one of the respective catches $f$ $f$ at points above their pivots and at its other end to a short link or lever $f^3$. The said link $f^3$ is rigidly secured upon a transversely-arranged rod $f^4$, pivotally mounted upon the block $F^4$, said rod being provided at one end with a right-angled horizontally-arranged extension $f^5$, upon which is formed or secured a weight $f^6$. The weighted arm $f^5$ thus serves to normally throw the catches $f$ $f$ outwardly, while at the same time forming a convenient handle by which said catches may be manipulated. A suitable handle E', rigidly secured to the rake-head, serves as a convenient means for lifting the rake.

D' D' are integral forward extensions of the arms D, and $d$ $d$ are counterbalance-weights arranged to slide on said arms. By moving said weights backward or forward the weight with which the rake-head E shall bear upon the ground may be regulated at will, thus making it possible to reduce the draft of the loader to a minimum in case of a light swath or to put practically the full weight of the rake on the ground in the case of very heavy hay or where it has been beaten into the stubble by rain or the like. Set-screws $d'$ $d'$ are provided for securing the weights in position when properly adjusted.

To now describe the elevator and its supports, G G are side frame-pieces which are secured to and extend upwardly and forwardly from near the rear ends of the frame-pieces B B at an angle of about forty-five degrees, said frame-pieces G G being of suitable length to reach from near the rake-teeth to the top of a loaded wagon. The frame-pieces G G are arranged to converge from bottom to top of the carrier, so as to reduce the width of the carrier to about three-fourths at its upper end of what it is at the lower end, and said pieces G G are supported at the proper angle by standards H H, which extend vertically up from the front of the main frame of the machine. Brace-irons $h$ $h'$ extend from points intermediate of the length of said vertical standards H H up to the under side of the elevator, on either side thereof, and other brace-irons $h^2$ extend from the inner sides of the standards H down to the central portion of the front cross-piece B'. The bottom floor of the elevator is formed by cross-pieces I I, secured at intervals across the under side of the pieces G G, upon which a flooring of light material is secured. The upper end of the elevator is made flaring or dropped down with relation to the general plane of the elevator, herein shown as formed by simply springing or curving the upper ends of the light flooring down and securing them to a cross-piece I. We have found in practice that such a construction both facilitates the delivery of the hay from the elevator and enables the person in the wagon to receive the hay on his fork before it is fairly out of the elevator in the case of a windy day.

To next describe the elevating mechanism by which the hay is elevated from the rake to the wagon, these parts are constructed as follows: A shaft K, mounted transversely of the carrier in bearing-apertures J J, formed in the standards F F, is provided between said bearing portions with a plurality (in this instance eight) of alternately oppositely arranged cranks $k$. At its center said crank-shaft is provided with a short bearing portion $k'$, formed in axial alinement with the end bearing portions, which passes through a support $F^5$, secured to and depending from the under side of the trussed cross-piece $F^2$. A brace or tie rod $F^6$ extends from the lower end of said hanger $F^5$ up to the central portion of a cross-piece $l^4$. Upon each of said cranks $k$ is mounted a longitudinally-arranged elevator-bar L. Said bars L extend from their respective cranks $k$ to the upper end of the elevator, where they are supported by and have sliding engagement with guides constructed as follows: Each bar L is provided on its upper side, near its end, with a short vertically upward extending arm $l$, rigidly secured thereto by means of a bolt $l'$, passed obliquely through said parts. Each of said arms $l$ extends between a pair of parallel guide-bars $l^2$ $l^2$, secured to supporting cross-bars $l^3$ $l^4$, which latter are carried by standards $l^5$ $l^6$, extending up from the side frames of the elevator. Pins $l^7$, inserted transversely through the upper ends of the arms $l$ and resting upon the guide-bars at each side thereof, provide a suitable sliding support for the bars L and also permit the latter to rise from said guide-bars freely. The arrangement of the guide-bars $l^2$ $l^2$ may be varied somewhat; but we have found in practice that the best results are obtained when they are arranged in a plane which converges considerably toward the general plane of the elevator with reference to the forward movement of the bars. We desire to call particular attention to this novel arrangement for supporting and guiding the upper ends of the bars, inasmuch as by its use the dipping and dragging-back motion of the upper ends of the bars present in prior constructions, in which the supports have been either arranged in planes parallel with the plane of the elevator or at some distance below the upper end of the bar, or both, is entirely obviated.

From the cranks $k$ back the remaining length of the elevator each elevator-bar is double—that is to say, bars L' L' are secured one on each side of each bar L, the connection between said bars being made by extending or lapping their ends past each other, passing a transverse bolt $l^8$ through the bars and interposed spacing-blocks $l^9$ $l^9$ back of the crank and securing them together in front of or above the crank by means of a cross casting or block $l^{10}$, secured across the upper sides of the outer bars, and to which cross-casting the central bar is adjustably secured by means of a vertical bolt $l^{11}$, provided with set-nuts, as clearly shown in the detail, Figs. 7 and 8. The cranks $k$ pass through bearing-blocks $L^2$ $L^2$, secured upon the upper sides of the outer bars only, thereby permitting the lower double bars L' L' to be adjusted by means of the bolts $l^{11}$, so as to stand at an angle with the upper bar L. The object of this construction is to enable the lower ends of the elevator-bars to be adjusted to stand away from the bottom of the carrier more or less, according to the conditions under which the machine is working. We have found in practice that by thus adjusting the bars their efficiency in elevating the hay promptly is greatly increased and liability of clogging or choking down the machine correspondingly decreased. The spacing-blocks $l^9$ $l^9$ are of proper width to cause the bars L' to pass centrally between each pair of rake-teeth $e$ $e$, and said bars are of such length as to extend, when at the backward limit of their movement, a slight distance beyond said teeth. The bars L L' are provided with depending forwardly-directed prongs $l^{12}$, spaced at suitable intervals throughout their length, those of the bars L' being preferably somewhat longer than the rest. It will be noted that one of the bars L' of each pair is enough shorter than the other so that its last prong $l^{12}$ never goes back beyond the teeth $e$. This is a feature of considerable importance by reason of the fact that when both bars have prongs which pass beyond the teeth some of the hay that projects back between the teeth is caught and turned crosswise in front of the pair of prongs, but behind the rake-tooth, and in each forward movement of the bar will act to pull the rake-tooth forward violently, and said hay, instead of being carried onward up the elevator, will eventually clog the machine. This is particularly liable to occur when the hay is heavy and of a somewhat stalky nature, such as "blue-joint" or the like. Each of the two outer bars L' of the series is provided with a guard $l^{13}$, secured to its upper side and extending back, as shown. The purpose of these guards is to prevent the two outer teeth from being accidentally thrown into the path of the outer elevator-bar in its backward motion, as might occur should one of said teeth strike an obstruction which would hold it back at the same time that the machine was turning a corner.

As a means of actuating the crank-shaft K sprocket-wheels K' are mounted thereon and driven through the medium of sprocket-chain belts $K^2$, passing around relatively large sprocket-wheels $K^3$, secured upon or forming part of the inner faces of the main supporting-wheels A. In order that said crank-shaft may be driven in the proper direction, the chains $K^2$ are trained underneath the sprocket-wheels K' and around guide-sprockets $K^4$, mounted in bearings on the standards F, thus securing a rotation in said crank-shaft the reverse of that which would result were the chain trained directly around the sprockets K'. In order that the tension of the belts $K^2$ may be properly adjusted, the bearings of the sprockets $K^4$ are mounted in curved slots $f^7$, within which said bearings may be moved up or down to the required position of adjustment and thereafter secured by means of a clamping-nut.

As a special and important feature of improvement we have herein shown a combined ungearing and backing ratchet device constructed and arranged as follows: The sprockets K' are both mounted loosely on the crank-shaft K and secured from slipping off by keys $k^2$, Figs. 9 and 10. On their inner sides each of said sprockets K' is provided with an integral ratchet-wheel $k^3$, which is engaged by a pawl $m$, pivotally mounted on the proximate face of a flat disk or wheel M. Said disk M is rigidly secured on the crank-shaft K by means of a through-pin $m'$, passed through its hub $m^2$ and said crank-shaft.

N is a spring formed of strap-steel, one end of which is secured flat against the face of the disk M and the body of the spring formed with a half-twist, so as to lie at its free end flatwise upon the upper side of the pawl $m$, as shown clearly in Figs. 9 and 10. The upper side of the pawl is provided with a blunt-pointed boss $m^3$, and the engaging end of the spring N is provided with a somewhat similar opposing boss $n$. The boss $n$ is so arranged that in throwing the pawl $m$ into or out of engagement with the ratchet-wheel its boss $m^3$ must slide past that of the spring N. The result of this arrangement is that the spring N serves to hold the pawl yieldingly in engagement with the ratchet-wheel when placed in that position or out of engagement when turned back. For convenience in thus throwing the pawl into or out of gear it is provided with a curved handle or tailpiece $m^4$, the outer end of which extends to the periphery of the disk when the pawl is in gear.

It will be obvious from the foregoing description that when in use the two devices form a perfect pair of backing or turning ratchets. It will also be apparent that they serve equally well when it is desired to throw the crank-shaft into or out of gear, the sprocket-wheels K' then becoming idle-wheels.

A machine constructed in accordance with the above description has important advantages. By reason of the location of the pivotal point of the rake-head well forward of the latter—that is, by providing it with relatively long supporting-arms—the rake is caused to swing on a relatively long radius and the action of the teeth in passing over any obstruction is to rise and fall in an arc approximately concentric with the end of the elevator. In other words, the rake-teeth in thus following the lay of the ground will not change the relative distance between themselves and the end of said carrier sufficient to allow the hay to get away from the elevator-bars and accumulate, thus tending to clog the elevator when suddenly brought within its reach by the return of the teeth to their normal position. The arrangement of the upper ends of the elevator-bars by which they have sliding engagement at their extreme ends with the parallel guide-bars, but are free to lift or rise therefrom, is a desirable construction. The arrangement of the guide or supporting bars in a plane converging toward the plane of the elevator is also an important feature. The sliding movement of the elevator-bars thereon at their upper end, in connection with the rotary movement imparted to their lower ends by the crank-shaft, gives to said bars a most efficient elevating and delivery action. As heretofore commonly constructed the elevator-bars have been arranged to slide on guides extending parallel with the plane of the elevator and in most instances supported at a point some distance below their upper ends. When thus arranged, the rotary motion of the lower ends of the bars produces a dipping and dragging-back motion at their upper ends, and, if they are not free to rise, forces them into the mass of hay, resulting in great strain on said bars and needless hard running of the machine. With the present construction, however, these objections are avoided. The weight of the bars and the forwardly-inclined position of their prongs will insure engagement with the hay, while at the same time the upper ends of the bars will rise and float upon the mass of hay in their return movement if the amount to be elevated is too great to allow them to slide upon the guides.

While we have herein shown what we consider to be the best construction and arrangement of the various parts of the machine, yet it will be obvious that the details thereof may be modified to a considerable extent without departing from the various features of the invention. We do not, therefore, desire to be limited to precise details of construction.

We claim as our invention—

1. The combination, with a hay-loader comprising a wheeled rake supported upon forwardly-extending arms pivoted to the main frame, of means for holding said rake-head in elevated position comprising yielding catches arranged on the frame and adapted to be compressed in the upward movement of said arms, and to automatically engage the latter when elevated, at points intermediate their length, means for simultaneously projecting said catches into the paths of the rake-arms comprising links connecting the catches with opposite ends of a pivoted lever, and a weight, or equivalent, acting on said lever to normally project said catches, substantially as set forth.

2. An elevator for hay-loaders, comprising a carrier, a plurality of pronged elevator-bars, cranks upon which said bars are mounted above said carrier, each of said bars comprising upper and lower sections, of which the lower is held rigidly at an angle with the upper section and divergent from the carrier-bed, means for adjusting the angle between said sections, and means for actuating said bars, substantially as set forth.

3. A hay-loader, comprising a curved springtoothed rake, a carrier-bed, a series of pronged elevator-bars, alternately-arranged rotary cranks upon which said bars are mounted above the carrier-bed, said elevator comprising at its lower end a bar for each space between the rake-teeth, which said bars are of different lengths alternately, the length of one set being such as to carry their end prongs entirely through and beyond the rake in the movement of the bar, while the length of the other set is such as to carry their end prongs to, but not beyond, the rake, substantially as set forth.

4. The combination with the elevator of a hay-loader of longitudinally-arranged pronged elevator-bars mounted between their ends upon alternate oppositely-arranged cranks, supports for the upper ends of the elevator-bars each comprising a pair of parallel bars arranged with an intervening space, above the elevator-bars; each of said elevator-bars having sliding engagement with the supporting-bars by means of an upturned part which extends through the space between the bars and has a pin inserted transversely therethrough at a point above the supporting-bars, whereby the elevator-bar is free to rise, substantially as set forth.

5. The combination, with the elevator of a hay-loader, of a transverse shaft adapted to support the elevator-bars bodily above the bed and provided with a plurality of cranks for the elevator-bars, a central bearing for said shaft comprising a trussed cross-beam arranged above said shaft, a hanger through which said shaft passes, depending from said cross-beam, a cross-bar supported from the elevator-bed at the upper end thereof, and a brace-rod extending from the lower end of said hanger and engaging said cross-bar, substantially as set forth.

6. The combination, with a wheeled rake having curved spring-teeth, of a hay-guard comprising a spring-tooth formed at its lower end into a loop arranged to stand at one end in advance of the rake-teeth and carried normally free from the ground, substantially as described.

7. The combination, with a hay-loader comprising a wheeled rake having curved spring-teeth, of a hay-guard comprising a spring-tooth formed at its lower end into a loop arranged to stand at one end and in advance of the rake-teeth and with said loop supported normally free from the ground, substantially as set forth.

In testimony that we claim the foregoing as our invention we affix our signatures in presence of two witnesses.

MEDERIC DROLET.
DAVID MARCEAU.
ULRIC MARCEAU.

Witnesses:
JOSEPH B. MARCEAU,
WINDLE G. BROOKS.